(12) United States Patent
Park (10) Patent No.: US 7,854,676 B2
(45) Date of Patent: Dec. 21, 2010

(54) HYDRAULIC CONTROL SYSTEM OF AUTOMATIC TRANSMISSION FOR VEHICLE

(75) Inventor: Dalsu Park, Anyang (KR)

(73) Assignee: Hyundai Motor Company, Seoul (KR)

( * ) Notice: Subject to any disclaimer, the term of this patent is extended or adjusted under 35 U.S.C. 154(b) by 497 days.

(21) Appl. No.: 11/950,668

(22) Filed: Dec. 5, 2007

(65) Prior Publication Data

US 2009/0023550 A1     Jan. 22, 2009

(30) Foreign Application Priority Data

Jul. 18, 2007    (KR)  ........................ 10-2007-0071884

(51) Int. Cl.
     *F16H 61/58*      (2006.01)
(52) U.S. Cl. .................. 475/120; 475/121; 477/53; 477/62
(58) Field of Classification Search ................. 475/116, 475/120, 121; 477/52, 53, 62
See application file for complete search history.

(56) References Cited

U.S. PATENT DOCUMENTS 6,299,560 B1 * 10/2001 Fujioka et al. .............. 475/119
6,503,169 B2 * 1/2003 Nakano et al. ................ 477/62
6,634,991 B2 * 10/2003 Itou et al. .................... 477/156
6,746,355 B2 * 6/2004 Shin et al. .................... 475/119

FOREIGN PATENT DOCUMENTS

JP          08-210494 A     8/1996
KR    20-1999-0031626 U     7/1999

* cited by examiner

*Primary Examiner*—Ha D. Ho
(74) *Attorney, Agent, or Firm*—Morgan, Lewis & Bockius LLP (57) ABSTRACT

A cost for manufacturing an automatic transmission can be reduced since a separate solenoid valve for controlling a damper clutch is not required when a hydraulic control system of an automatic transmission for a vehicle includes: a regulator valve that forms a line pressure by regulating a hydraulic pressure generated by a hydraulic pump; a torque converter control valve that receives a hydraulic pressure from the regulator valve and supplies a torque converter operating pressure to a torque converter; and a damper clutch control valve that receives the hydraulic pressure of the torque converter control valve and selectively supplies the torque converter operating pressure and a damper clutch operating pressure, wherein the damper clutch control valve is controlled by a control pressure supplied from a switch valve that is controlled an operating pressure of an overdrive clutch that operates at third and fourth forward speeds.

10 Claims, 7 Drawing Sheets

HYDRAULIC CONTROL SYSTEM OF AUTOMATIC TRANSMISSION FOR VEHICLE

CROSS-REFERENCE TO RELATED APPLICATION

This application claims priority to and the benefit of Korean Patent Application No. 10-2007-0071884, filed in the Korean Intellectual Property Office on Jul. 18, 2007, the entire contents of which are incorporated herein by reference.

BACKGROUND OF THE INVENTION (a) Field of the Invention

The present invention relates to a hydraulic control system of an automatic transmission for a vehicle. More particularly, the present invention relates to a hydraulic control system of an automatic transmission for a vehicle that can be exempt from a damper clutch control solenoid valve such that a cost may be reduced.

(b) Description of the Related Art

Typically, an automatic transmission automatically controls its shifting operation. For such an automatic shifting control, a shift control apparatus controls hydraulic pressure of a plurality of solenoid valves depending on various vehicle running states such as a vehicle speed and a throttle valve opening.

If a driver moves a select lever to a desired shift range, a manual valve in a hydraulic control system realizes a line conversion. In this case, a hydraulic pressure supplied from an oil pump is supplied to friction elements operating in respective shift-speeds according to a duty control of solenoid valves.

Figure 8:
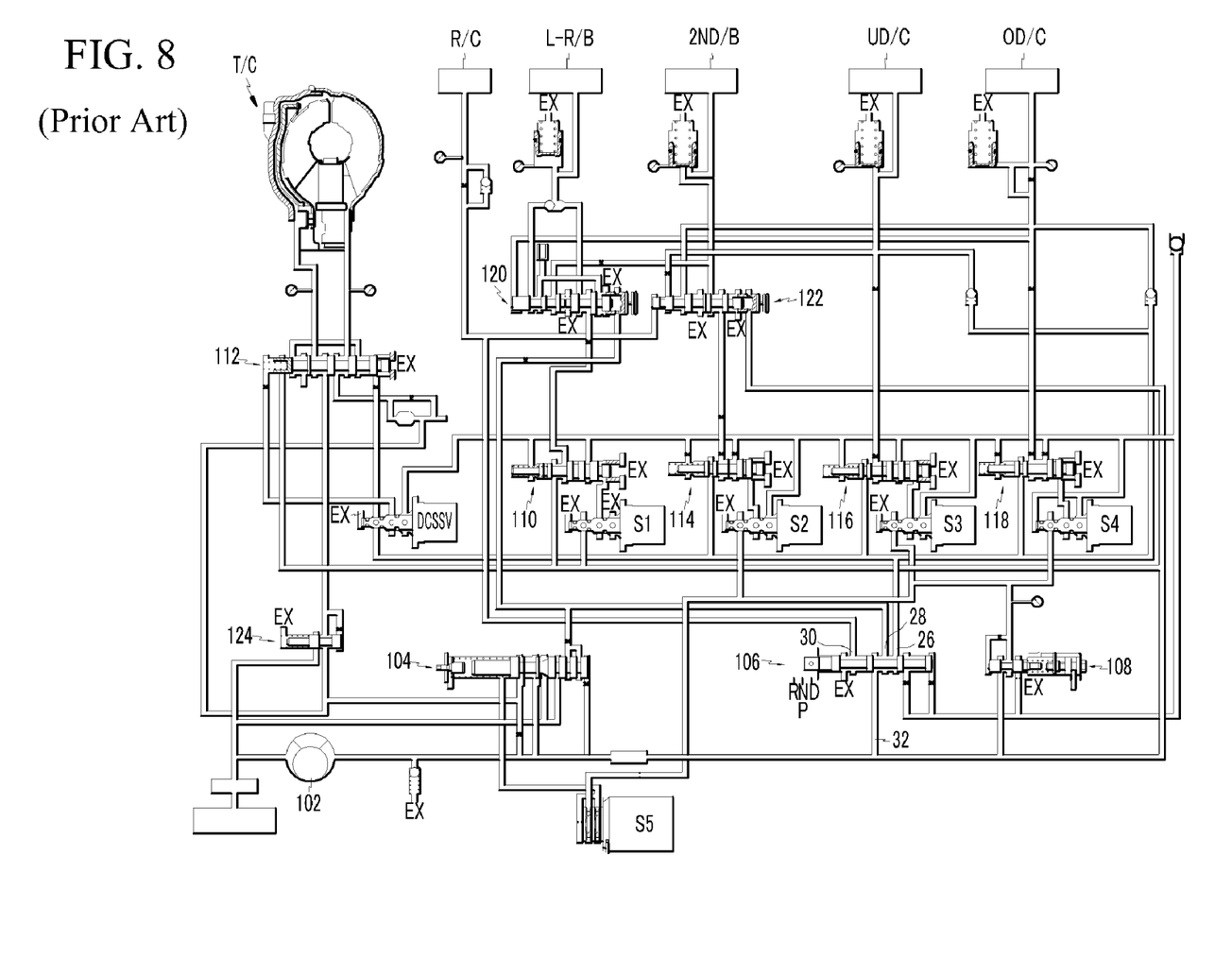
FIG. 8 shows an example of a conventional hydraulic control system.

As an example of such an automatic transmission, a hydraulic control system of an automatic transmission that enables four forward speeds and one reverse speed is hereinafter described with reference to FIG. 8. As shown in FIG. 8, a hydraulic pressure generated at a hydraulic pump 102 is controlled to a regulated pressure by a regulator valve 104. The regulated pressure of the regulator valve 104 is supplied to a manual valve 106, a reducing valve 108, a low-reverse brake (L-R/B) solenoid valve S1 (hereinafter called a first solenoid valve S1), a low-reverse brake (L-R/B) pressure control valve 10 (hereinafter called a first pressure control valve 110), and a damper clutch control valve 112. As shown in FIG. 8, the first solenoid valve S1 receives the regulated pressure of the regulator valve 104 as a control pressure. In addition, the first pressure control valve 10 is controlled by the first solenoid valve S1.

In addition, the manual valve 106 realizes hydraulic line conversion according to a range conversion of the select lever (not shown). By the manual valve 106, the hydraulic pressure supplied from the regulator valve 104 is supplied to a second brake (2ND/B) pressure control valve 114 (hereinafter called a second pressure control valve 114), an underdrive clutch (UD/C) pressure control valve 116 (hereinafter called a third pressure control valve 116), and an overdrive clutch (OD/C) pressure control valve 118 (hereinafter called a fourth pressure control valve 118).

In addition, the reduced hydraulic pressure of the reducing valve 108 is supplied to a second brake (2ND/B) solenoid valve S2 (hereinafter called a second solenoid valve S2), an underdrive clutch (UD/C) solenoid valve S3 (hereinafter called a third solenoid valve S3), and an overdrive clutch (OD/C) solenoid valve S4 (hereinafter called a fourth solenoid valve S4) that respectively control the second, third, and fourth pressure control valves 114, 116, and 118.

In addition, the reduced pressure of the reducing valve 108 is also supplied to a proportional control solenoid valve S5 that controls the regulator valve 104, such that the line pressure may be controlled by controlling the proportional control solenoid valve S5 depending on a driving condition of a vehicle.

The hydraulic pressures controlled at the first, second, third, and fourth pressure control valves 110, 114, 116, and 118 according to the control of the first, second, third, and fourth solenoid valves S1, S2, S3, and S4 are supplied to frictional elements, directly or through first and second fail-safe valves 120 and 122.

That is, the first solenoid valve S1 and the first pressure control valve 110 are connected with a low-reverse brake (L-R/B) that operates at a first forward speed and a reverse speed, through the first fail-safe valve 120. The second solenoid valve S2 and the second pressure control valve 114 is connected with a second brake (2ND/B) that operates at second and fourth forward speeds, through the second fail-safe valve 122.

In addition, the third solenoid valve S3 and the third pressure control valve 116 are directly connected with an underdrive clutch (UD/C) that operates at first, second, and third forward speeds. The fourth solenoid valve S4 and the fourth pressure control valve 118 are directly connected with an overdrive clutch (OD/C) that operates at third and fourth forward speed.

A reverse clutch (R/C) that operates at the reverse speed is directly connected with the manual valve 106.

In addition, the regulated hydraulic pressure of the regulator valve 104 is also supplied to a torque converter control valve 124 that controls a hydraulic pressure supplied to a torque converter (TC), and also supplied to damper clutch control valve 112 that controls a hydraulic pressure supplied to a damper clutch for enhancing power delivery efficiency of the torque converter (TC).

The damper clutch control valve 112 controls an on/off operation of the damper clutch according to a control of a damper clutch control solenoid valve (DCCSV).

By such an arrangement, the first, second, third, and fourth solenoid valves S1, S2, S3, and S4 are controlled by a transmission control unit (TCU) (not shown) so as to control the first, second, third, and fourth pressure control valves 100, 114, 116, and 118, such that each frictional element is supplied with or released from the supplied pressure depending on shift-speeds so as to realize multi-speeds.

Such a hydraulic control system employs a solenoid valve for controlling a damper clutch control valve, which causes an increase of a cost for an automatic transmission. Therefore, if an automatic transmission may be exempt from the solenoid valve for controlling the damper clutch control valve while maintaining substantially equivalent functioning of the transmission, it may contribute to reduction of the cost for manufacturing the transmission.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hydraulic control system of an automatic transmission for a vehicle having an advantage of a reduced cost for manufacture.

An exemplary embodiment of the present invention provides a hydraulic control system of an automatic transmission for a vehicle including: a regulator valve that forms a line pressure by regulating a hydraulic pressure generated by a hydraulic pump; a torque converter control valve that receives a hydraulic pressure from the regulator valve and supplies a torque converter operating pressure to a torque converter; and a damper clutch control valve that receives the hydraulic pressure of the torque converter control valve and selectively supplies the torque converter operating pressure and a damper clutch operating pressure, wherein the damper clutch control valve is controlled by a control pressure supplied from a switch valve that is controlled an operating pressure of an overdrive clutch that operates at third and fourth forward speeds.

The damper clutch control valve may selectively supply the torque converter operating pressure and the line pressure to the torque converter.

The exemplary hydraulic control system may further include a first solenoid valve that operates to output a hydraulic pressure at one or more predetermined speeds other than the third and fourth forward speeds, wherein the switching valve may selectively supply a forward range pressure of forward speeds and an output pressure of the first solenoid valve to the damper clutch control valve as a control pressure.

The switching valve may include a valve body and a valve spool installed therein. The valve body may include a first port that receives an inflow of the forward range pressure, a second port that supplies the hydraulic pressure received through the first port to the damper clutch control valve as its control pressure, a third port that receives an output pressure of the first solenoid valve, a fourth port that receives a low-reverse brake operating pressure from the first pressure control valve, a fifth port that supplies the hydraulic pressure received through the fourth port to the first fail-safe valve, a sixth port that exhausts the hydraulic pressure received through the fifth port, and a seventh port that receives a overdrive clutch operating pressure as its control pressure. The valve spool may operate by hydraulic pressures supplied through the first, third, and seventh ports.

The valve spool of the switching valve may include: a first land that receives a hydraulic pressure supplied through the first port, and selectively enables fluid communication between the first and second ports; a second land that selectively enables fluid communication between the second and third ports, cooperatively with the first land; a third land that selectively enables fluid communication between the fourth and fifth ports, cooperatively with the second land; and a fourth land that receives a hydraulic pressure supplied through the seventh port, and selectively enables fluid communication between the fifth and sixth ports, cooperatively with the third land.

The fourth land may be formed of a larger diameter than the first land.

The damper clutch control valve may include a valve body and a valve spool installed therein. The valve body of the damper clutch control valve may include a first port that selectively receives the forward range pressure from the switching valve or the output pressure of the first solenoid valve; a second port that always receives the line pressure; a third port that bypasses the hydraulic pressure supplied through the second port; a fourth port that receives the hydraulic pressure from the torque converter control valve; a fifth port that selectively supplies the hydraulic pressure received through the fourth port to the torque converter; a sixth port that supplies the damper clutch operating pressure to the torque converter or receives the hydraulic pressure exhausted from the torque converter; a seventh port that selectively fluid-communicates with the sixth port so as to exhaust the hydraulic pressure received through the sixth port; an eighth port that selectively fluid-communicates with the sixth port so as to supply the damper clutch operating pressure that is received from the third port; and a ninth port that selectively receives a control pressure. The valve spool may operate by hydraulic pressures supplied through the first and ninth ports.

The valve spool of the damper clutch control valve may include: a first land that is applied with the control pressure received through the first port; a second land that selectively enables fluid communication between the second and third ports, cooperatively with the first land; a third land that selectively enables fluid communication between the fourth and fifth ports, cooperatively with the second land; a fourth land that selectively enables fluid communication between the sixth and seventh ports, cooperatively with the third land; and a fifth land that is applied with the control pressure of the ninth port and selectively enables fluid communication between the sixth and eighth ports, cooperatively with the fourth land.

According to such an exemplary embodiment of the present invention, the damper clutch can be controlled at third and fourth forward speeds by using a switching valve without additionally employing a separate solenoid valve for controlling a damper clutch. Therefore, a less number of solenoid valves are required and thus the cost for manufacturing an automatic transmission is substantially reduced.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
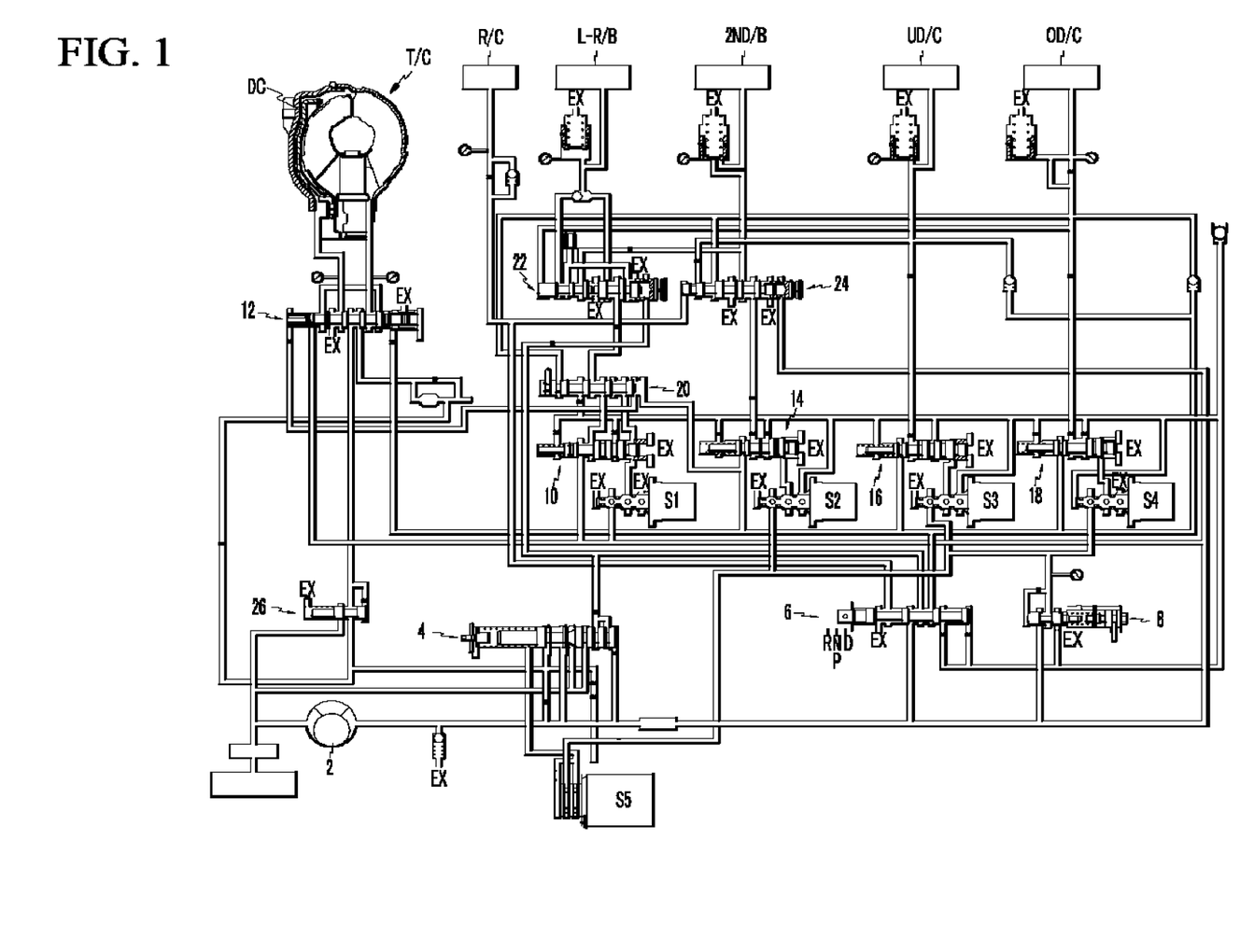
FIG. 1 is a schematic diagram of a hydraulic control system according to an exemplary embodiment of the present invention.

FIG. 1 is a schematic diagram of a hydraulic control system according to an exemplary embodiment of the present invention. A hydraulic pressure generated at a hydraulic pump 2 is controlled to be a regulated pressure by a regulator valve 4. The regulated pressure of the regulator valve 4 is directly supplied to a manual valve 6, a reducing valve 8, a low-reverse brake (L-R/B) solenoid valve S1 (hereinafter called a first solenoid valve S1), a low-reverse brake (L-R/B) pressure control valve 10 (hereinafter called a first pressure control valve 10), and a damper clutch control valve 12. As shown in FIG. 1, the first solenoid valve S1 receives the regulated pressure of the regulator valve 4 as a control pressure. In addition, the first pressure control valve 10 is controlled by the first solenoid valve S1.

In addition, the manual valve 6 realizes hydraulic line conversion according to a range conversion of the select lever (not shown). By the manual valve 6, the hydraulic pressure supplied from the regulator valve 4 is supplied to a second brake (2ND/B) pressure control valve (hereinafter called a second pressure control valve 14), an underdrive clutch (UD/C) pressure control valve (hereinafter called a third pressure control valve 16), and an overdrive clutch (OD/C) pressure control valve (hereinafter called a fourth pressure control valve 18).

In addition, the reduced hydraulic pressure of the reducing valve 8 is supplied, as source pressures, to a second brake (2ND/B) solenoid valve S2 (hereinafter called a second solenoid valve S2), an underdrive clutch (UD/C) solenoid valve S3 (hereinafter called a third solenoid valve S3), and an overdrive clutch (OD/C) solenoid valve S4 (hereinafter called a fourth solenoid valve S4) that respectively control the second, third, and fourth pressure control valves 14, 16, and 18.

In addition, the reduced pressure of the reducing valve 8 is also supplied to a proportional control solenoid valve S5 that controls the regulator valve 4, such that the line pressure may be controlled by controlling the proportional control solenoid valve S5 depending on a driving condition of a vehicle.

The hydraulic pressures controlled at the first, second, third, and fourth pressure control valves 10, 14, 16, and 18 according to the control of the first, second, third, and fourth solenoid valves S1, S2, S3, and S4 are supplied to frictional elements, directly or through a switching valve 20 and first and second fail-safe valves 22 and 24.

That is, the first solenoid valve S1 and the first pressure control valve 10 are connected with a low-reverse brake (L-R/B) that operates at a first forward speed and a reverse speed, through the switching valve 20 and the first fail-safe valve 22. The second solenoid valve S2 and the second pressure control valve 14 is connected with a second brake (2ND/B) that operates at second and fourth forward speeds, through the second fail-safe valve 24.

In addition, the third solenoid valve S3 and the third pressure control valve 16 are directly connected with an underdrive clutch (UD/C) that operates at first, second, and third forward speeds. The fourth solenoid valve S4 and the fourth pressure control valve 18 are directly connected with an overdrive clutch (OD/C) that operates at third and fourth forward speed.

A reverse clutch (R/C) that operates at the reverse speed is directly connected with the manual valve 106.

In addition, the regulated hydraulic pressure of the regulator valve 4 is also supplied to a torque converter control valve 26 that controls a hydraulic pressure supplied to a torque converter (TC), and also supplied to damper clutch control valve 12 that controls a hydraulic pressure supplied to a damper clutch for enhancing power delivery efficiency of the torque converter (TC).

By such an arrangement, the first, second, third, and fourth solenoid valves S1, S2, S3, and S4 are controlled by a transmission control unit (TCU) (not shown) so as to control the first, second, third, and fourth pressure control valves 10, 14, 16, and 18, such that each frictional element is supplied with or released from the supplied pressure depending on shift-speeds so as to realize multi-speeds.

According to such a hydraulic control system of an exemplary embodiment of the present invention, a conventional damper clutch control solenoid valve DCCSV (refer to FIG. 8) is removed. Instead, the hydraulic control system is configured such that a part of a forward range pressure is supplied to the damper clutch control valve 12 as its control pressure, according to controlling of the switching valve 20 interposed between the first pressure control valve 10 and the first fail-safe valve 22.

Figure 2:
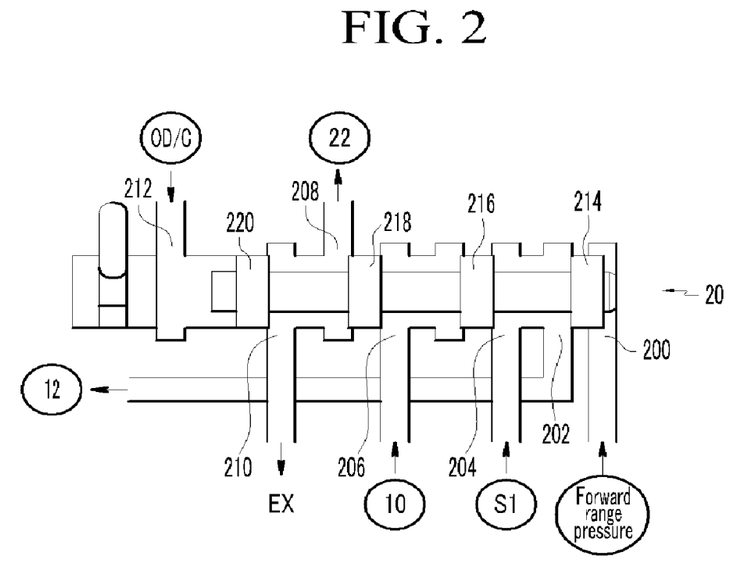
FIG. 2 is a schematic diagram of a switching valve according to an exemplary embodiment of the present invention.

For this purpose, the switching valve 20 of an exemplary embodiment of the present invention is arranged as shown in FIG. 2. That is, a valve body of the switching valve 20 includes first, second, third, fourth, fifth, sixth, and seventh ports 200, 202, 204, 206, 208, 210, and 212. The first port 200 receives an inflow of the forward range pressure. The second port 202 supplies the hydraulic pressure received through the first port 200 to the damper clutch control valve 12 as its control pressure. The third port 204 receives an output pressure of the first solenoid valve S1. The fourth port 206 receives a low-reverse brake (L-R/B) operating pressure from the first pressure control valve 10. The fifth port 208 supplies the hydraulic pressure received through the fourth port 206 to the first fail-safe valve 22. The sixth port 210 exhausts the hydraulic pressure received through the fifth port 208. The seventh port 212 receives a overdrive clutch (OD/C) operating pressure as its control pressure.

In addition, a valve spool of the switching valve 20 installed in the valve body includes first, second, third, and fourth lands 214, 216, 218, and 220. The first land 214 receives a hydraulic pressure supplied through the first port 200, and selectively enables fluid communication between the first and second ports 200 and 202. The second land 216 selectively enables fluid communication between the second and third ports 202 and 204, cooperatively with the first land 214. The third land 218 selectively enables fluid communication between the fourth and fifth ports 206 and 208, cooperatively with the second land 216. The fourth land 220 receives a hydraulic pressure supplied through the seventh port 212, and selectively enables fluid communication between the fifth and sixth ports 208 and 210, cooperatively with the third land 218. The first, second, and third lands 214, 216, and 218 are formed of the same diameter, and the fourth land 220 is formed of a diameter larger than that of the first, second, and third lands 214, 216, and 218.

Figure 3:
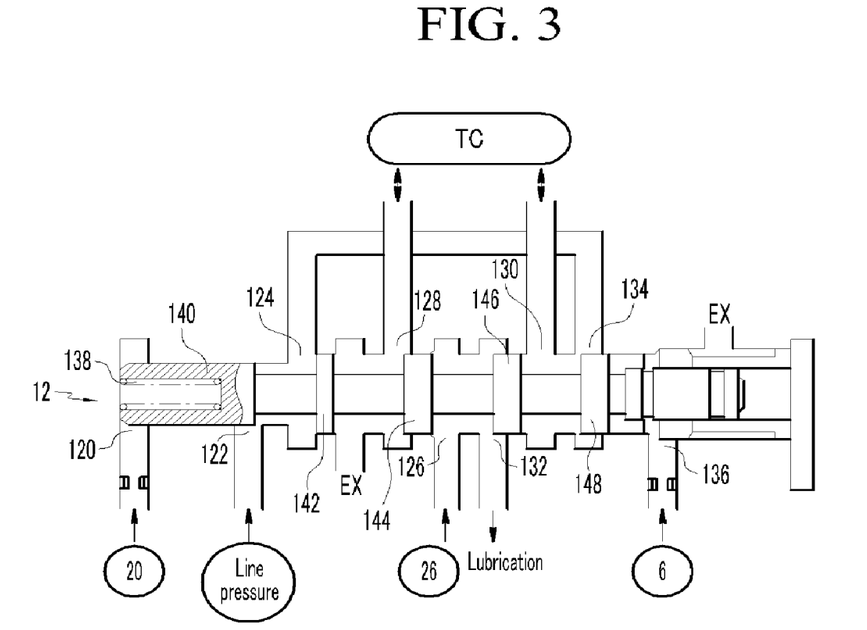
FIG. 3 is a schematic diagram of a damper clutch control valve according to an exemplary embodiment of the present invention.

In addition, the damper clutch control valve 12 that receives the control pressure from the second port 202 of the switching valve 20 is arranged as shown in FIG. 3. That is, a valve body of the damper clutch control valve 12 includes first, second, third, fourth, fifth, sixth, seventh, eighth, and ninth ports 120, 122, 124, 126, 128, 130, 132, 134, and 136. The first port 120 selectively receives the forward range pressure from the second port 202 of the switching valve 20 or the output pressure of the first solenoid valve S1. The second port 122 always receives the line pressure. The third port 124 bypasses the hydraulic pressure supplied through the second port 122. The fourth port 126 receives the hydraulic pressure from the torque converter control valve 26. The fifth port 128 selectively supplies the hydraulic pressure received through the fourth port 126 to the torque converter TC. The sixth port 130 supplies the damper clutch operating pressure to the torque converter TC or receives the hydraulic pressure exhausted from the torque converter TC. The seventh port 132 selectively fluid-communicates with the sixth port 130 so as to exhaust the hydraulic pressure received through the sixth port 130. The eighth port 134 selectively fluid-communicates with the sixth port 130 so as to supply the damper clutch operating pressure that is received from the third port 124. The ninth port 136 selectively receives a control pressure.

In addition, a valve spool of the damper clutch control valve 12 that is installed in the valve body thereof includes first, second, third, and fourth lands 140, 142, 144, and 146. The first land 140 is applied with the control pressure received through the first port 120 from the switching valve 20. The second land 142 selectively enables fluid communication between the second and third ports 122 and 124, cooperatively with the first land 140. The third land 144 selectively enables fluid communication between the fourth and fifth ports 126 and 128, cooperatively with the second land 142. The fourth land 146 selectively enables fluid communication between the sixth and seventh ports 130 and 132, cooperatively with the third land 144. The fifth land 148 is applied with the control pressure of the ninth port 136 received from the manual valve 6 and selectively enables fluid communication between the sixth and eighth ports 130 and 134, cooperatively with the fourth land 146. A spring 138 is arranged between the valve body and the first land 140.

In such a hydraulic control system, the frictional elements of the reverse clutch R/C, the low-reverse brake L-R/B, the second brake 2ND/B, the underdrive clutch UD/C, and the overdrive clutch OD/C receive hydraulic pressures so as to realize four forward speeds and one reverse speed by being operated according to a schedule of the following table.

TABLE 1

Operational chart for frictional elements

|  | L-R/B | 2ND/B | UD/C | OD/C | R/C |
|---|---|---|---|---|---|
| 1st speed |  |  | ○ |  |  |
| 2nd speed |  | ○ | ○ |  |  |
| 3rd speed |  |  | ○ | ○ |  |
| 4th speed |  | ○ |  | ○ |  |
| Reverse speed | ○ |  |  |  | ○ |
| Neutral position | ○ |  |  |  |  |

In order to realize the operation schedule of the frictional elements according to the above table, the first, second, third, and fourth solenoid valves S1, S2, S3, and S4 are operated according to a schedule of the following table.

TABLE 2

Operational chart for solenoid valves

|  | S1 | S2 | S3 | S4 |
|---|---|---|---|---|
| 1st speed | OFF | ON | OFF | ON |
| 2nd speed | ON | OFF | OFF | ON |
| 3rd speed | ON/OFF | ON | OFF | OFF |
| 4th speed | ON/OFF | OFF | ON | OFF |
| Reverse speed | OFF | ON | ON | ON |
| Neutral position | OFF | ON | ON | ON |

Figure 4:
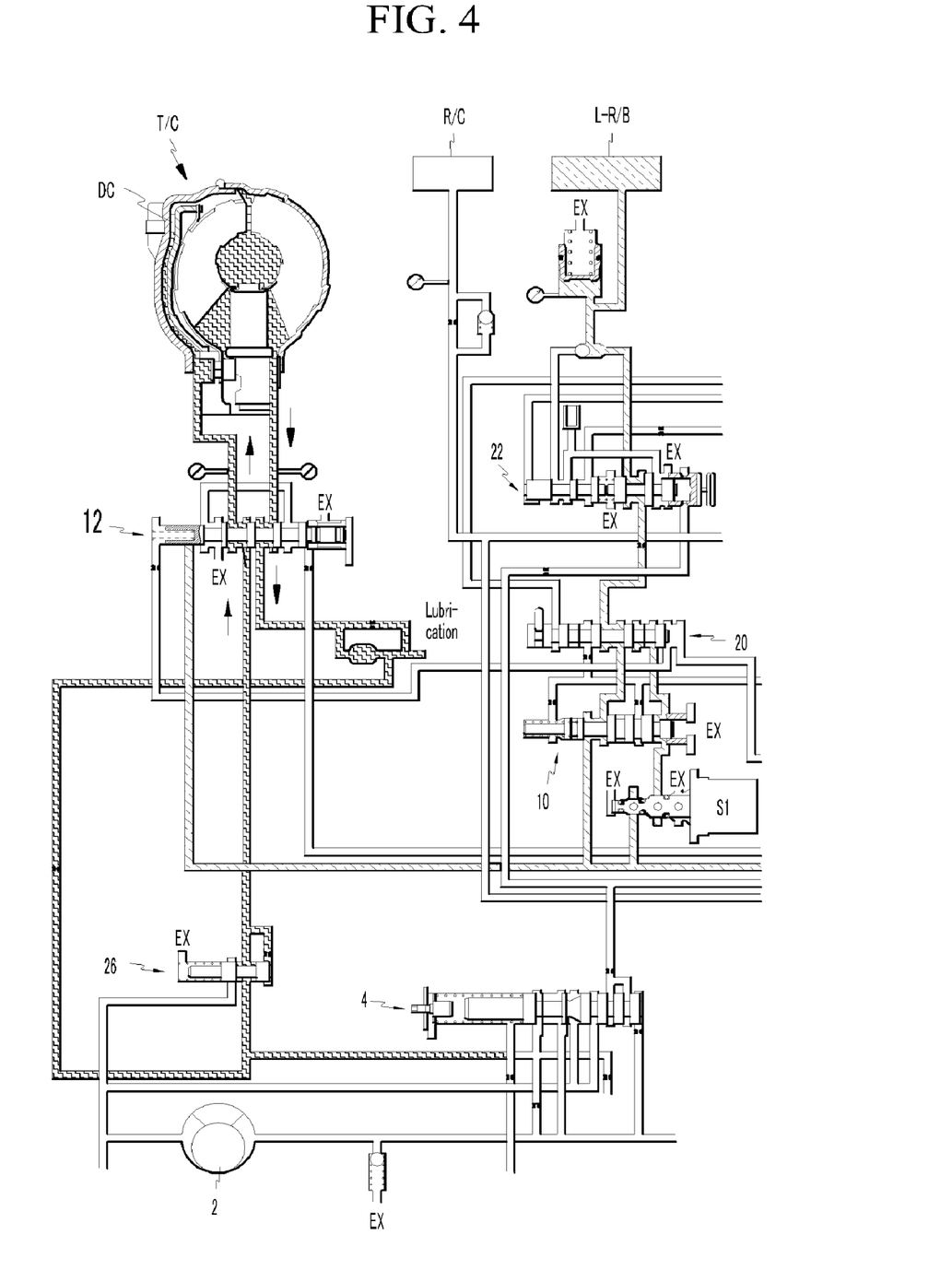
FIG. 4 is a partial diagram of the hydraulic control system that shows a hydraulic pressure flow of the damper clutch in the neutral N range.

In such an arrangement, the damper clutch control valve 12 is not applied with any control pressure in the neutral N range, as shown in FIG. 4. Therefore, the valve spool of the damper clutch control valve 12 is moved to the right in the drawing by the elastic force of the spring 138, and the hydraulic pressure circulates the torque converter in a direction of arrows shown in FIG. 4. In this case, the damper clutch DC is in a non-operation state.

Figure 5:
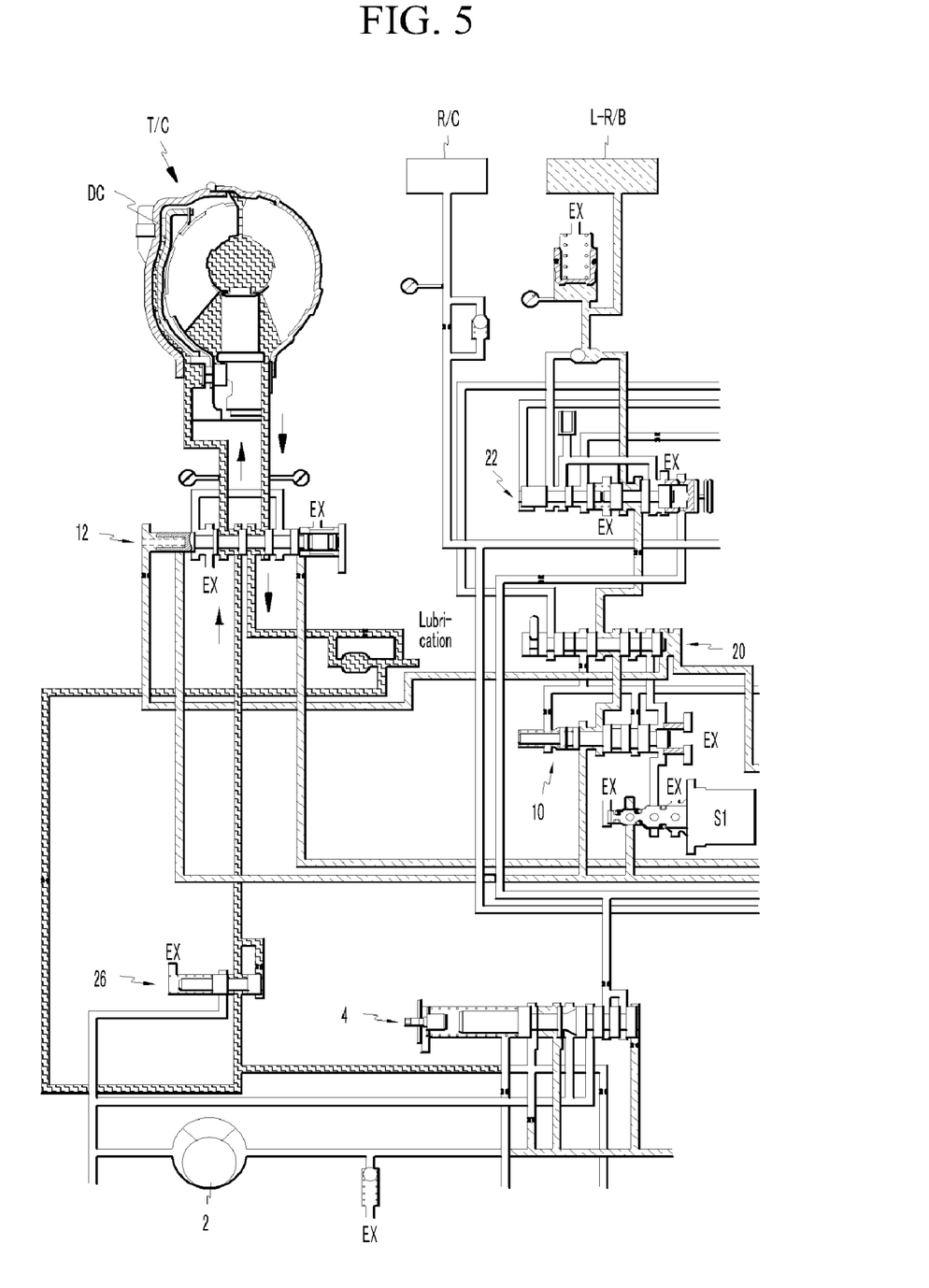
FIG. 5 is a partial diagram of the hydraulic control system that shows a hydraulic pressure flow of the damper clutch at the first forward speed.

In the first forward speed, as shown in FIG. 5, the forward range pressure is supplied from the manual valve 6 to the switching valve 20 through the first port 200, and therefore, the valve spool thereof is moved to the left in the drawing since the hydraulic pressure received through the first port 200 is applied to the first land 214.

Accordingly, the first and second ports 200 and 202 fluidly communicate with each other such that the forward range pressure is supplied to the first port 120 of the damper clutch control valve 12 as the control pressure. In this case, the valve spool of the damper clutch control valve 12 remains moved to the right in the drawing. Therefore, the hydraulic pressure circulates the torque converter in a direction of arrows shown in FIG. 5, and the damper clutch DC is in a non-operation state.

In the third and fourth forward speeds, the fourth solenoid valve S4 is controlled off, and thus the overdrive clutch OD/C is operated. Therefore, the overdrive clutch operating pressure is supplied to the seventh port 212 of the switching valve 20 as its control pressure. Since the fourth land 220 of the switching valve 20 has a larger diameter than the first land 214, the valve spool of the switching valve 20 remains moved to the right in the drawing even though the forward range pressure is applied to the first land 214 through the first port 220. In such third and fourth forward speeds, the controlling on/off operation of the first solenoid valve S1 does not affect formation of desired shift-speed.

Figure 6:
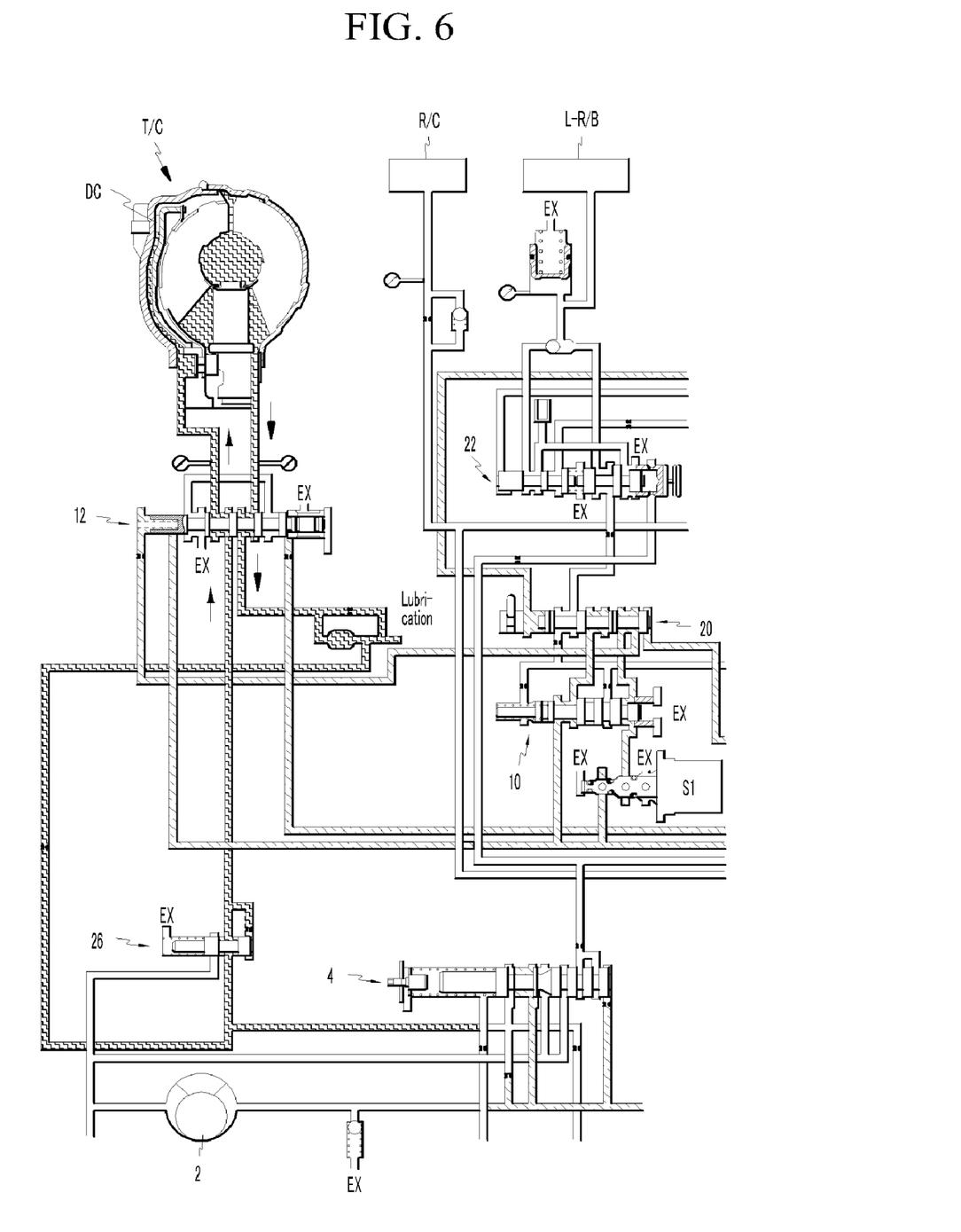
FIG. 6 is a partial diagram of the hydraulic control system that shows a hydraulic pressure flow of the damper clutch while the damper clutch is not operated at the third and fourth forward speeds.

In such third and fourth forward speeds, when the damper clutch is not required to be operated, the first solenoid valve S1 is turned off by the transmission control unit (TCU). In this case, the output pressure of the first solenoid valve S1 is supplied to the first port 120 of the damper clutch control valve 12 through the third and second ports 204 and 202 of the switching valve 20. Therefore, the valve spool of the damper clutch control valve 12 remains moved to the right in the drawing, and thus the hydraulic pressure circulates the torque converter in the arrow direction of FIG. 6. In this case, the damper clutch DC is in a non-operation state.

Figure 7:
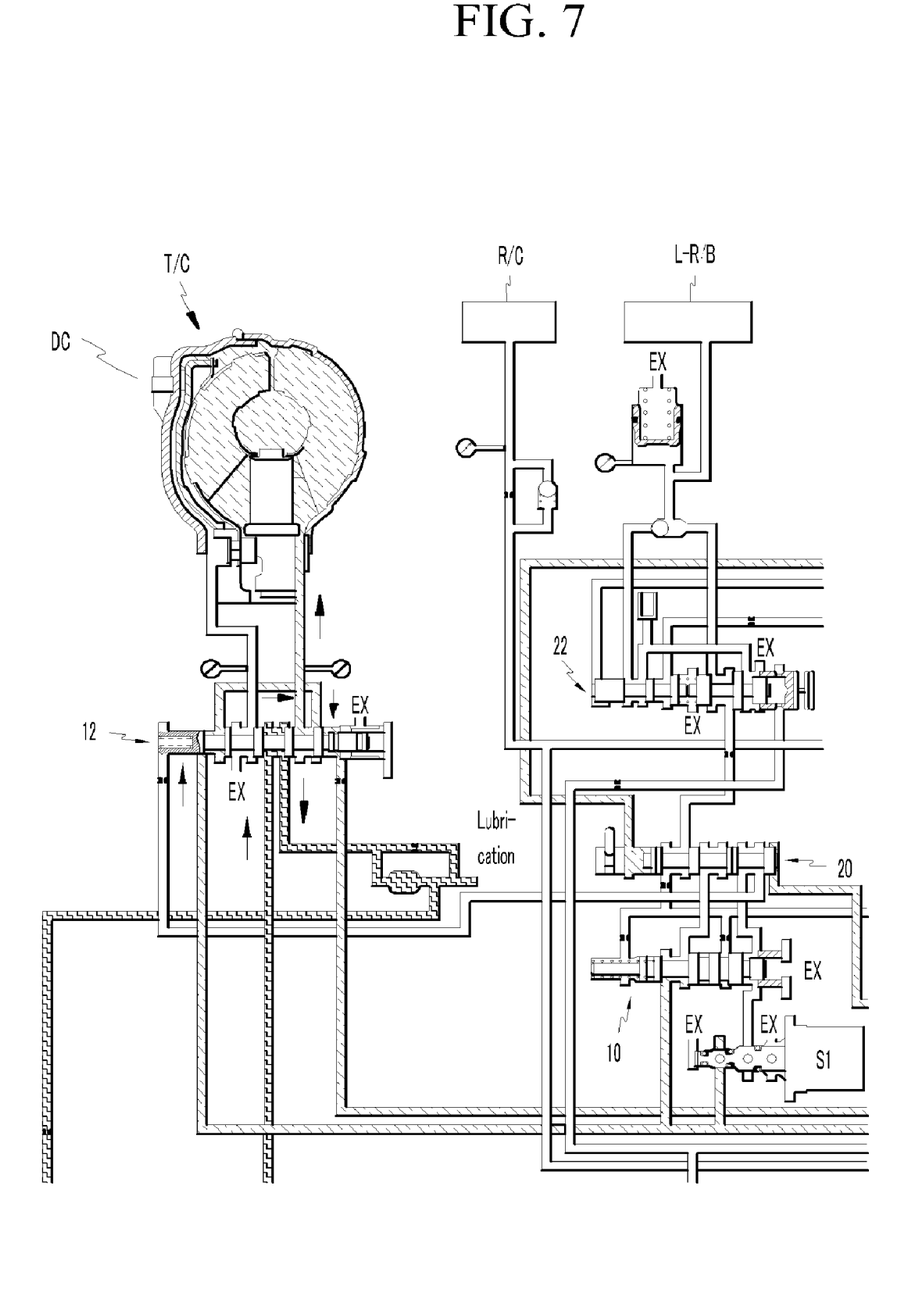
FIG. 7 is a partial diagram of the hydraulic control system that shows a hydraulic pressure flow of the damper clutch while the damper clutch is operated at the third and fourth forward speeds.

When the damper clutch DC is desired to be operated in the third and fourth forward speeds depending on driving conditions, the first solenoid valve S1 is turned on. Then as shown in FIG. 7, the damper clutch control valve 12 does not receive any control pressure from the switching valve 20 while it receives the forward range pressure through the ninth port 136. Therefore, the valve spool of the damper clutch control valve 12 moves to the left in the drawing, overcoming the elastic force of the spring 138.

Accordingly, the second and third ports 122 and 124 fluidly communicate with each other, and the sixth and eighth ports 130 and 134 fluidly communicate with each other. Therefore, the line pressure at the second port 122 is supplied to the torque converter as the damper clutch operating pressure sequentially through the third, eighth, and sixth ports 124, 134, and 130, and thus the damper clutch (DC) is operated.

In this case, the hydraulic pressure supplied through the fourth port 126 is exhausted through the seventh port 132 as a lubrication hydraulic pressure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of an automatic transmission for a vehicle comprising:
   a regulator valve that forms a line pressure by regulating a hydraulic pressure generated by a hydraulic pump;
   a torque converter control valve that receives the hydraulic pressure from the regulator valve and supplies a torque converter operating pressure to a torque converter; and
   a damper clutch control valve that receives the hydraulic pressure of the torque converter control valve and selectively supplies the torque converter operating pressure and a damper clutch operating pressure,
   wherein the damper clutch control valve is controlled by a control pressure supplied from a switching valve that is controlled by an operating pressure of an overdrive clutch that operates at third and fourth forward speeds.

2. The hydraulic control system of claim 1, wherein the damper clutch control valve selectively supplies the torque converter operating pressure and the line pressure to the torque converter.

3. The hydraulic control system of claim 2, further comprising a first solenoid valve that operates to output a hydraulic pressure at one or more predetermined speeds other than the third and fourth forward speeds,
   wherein the switching valve selectively supplies a forward range pressure of forward speeds and an output pressure of the first solenoid valve to the damper clutch control valve as a control pressure.

4. The hydraulic control system of claim 2, wherein the switching valve comprises a valve body and a valve spool installed therein, the valve body including:
   a first port that receives an inflow of a forward range pressure,
   a second port that supplies the hydraulic pressure received through the first port to the damper clutch control valve as its control pressure,
   a third port that receives an output pressure of a first solenoid valve,
   a fourth port that receives a low-reverse brake operating pressure from the first pressure control valve,
   a fifth port that supplies the hydraulic pressure received through the fourth port to a first fail-safe valve,
   a sixth port that exhausts the hydraulic pressure received through the fifth port, and
   a seventh port that receives a overdrive clutch operating pressure as its control pressure; and
   the valve spool operates by hydraulic pressures supplied through the first, third, and seventh ports.

5. The hydraulic control system of claim 3, wherein the switching valve comprises a valve body and a valve spool installed therein, the valve body including:
   a first port that receives an inflow of the forward range pressure,
   a second port that supplies the hydraulic pressure received through the first port to the damper clutch control valve as its control pressure,
   a third port that receives an output pressure of the first solenoid valve,
   a fourth port that receives a low-reverse brake operating pressure from the first pressure control valve,
   a fifth port that supplies the hydraulic pressure received through the fourth port to a first fail-safe valve,
   a sixth port that exhausts the hydraulic pressure received through the fifth port, and
   a seventh port that receives a overdrive clutch operating pressure as its control pressure; and
   the valve spool operates by hydraulic pressures supplied through the first, third, and seventh ports.

6. The hydraulic control system of claim 4 or 5, wherein the valve spool of the switching valve comprises:
   a first land that receives a hydraulic pressure supplied through the first port, and selectively enables fluid communication between the first and second ports;
   a second land that selectively enables fluid communication between the second and third ports, cooperatively with the first land;
   a third land that selectively enables fluid communication between the fourth and fifth ports, cooperatively with the second land; and
   a fourth land that receives a hydraulic pressure supplied through the seventh port, and selectively enables fluid communication between the fifth and sixth ports, cooperatively with the third land.

7. The hydraulic control system of claim 6, wherein the fourth land is formed of a larger diameter than the first land.

8. The hydraulic control system of claim 2, wherein the damper clutch control valve comprises a valve body and a valve spool installed therein, the valve body of the damper clutch control valve including:
   a first port that selectively receives the forward range pressure from the switching valve or an output pressure of a first solenoid valve,
   a second port that always receives the line pressure,
   a third port that bypasses the hydraulic pressure supplied through the second port,
   a fourth port that receives the hydraulic pressure from the torque converter control valve,
   a fifth port that selectively supplies the hydraulic pressure received through the fourth port to the torque converter, a sixth port that supplies the damper clutch operating pressure to the torque converter or receives the hydraulic pressure exhausted from the torque converter, a seventh port that selectively fluid-communicates with the sixth port so as to exhaust the hydraulic pressure received through the sixth port, an eighth port that selectively fluid-communicates with the sixth port so as to supply the damper clutch operating pressure that is received from the third port, and a ninth port that selectively receives a control pressure; and the valve spool operates by hydraulic pressures supplied through the first and ninth ports.

9. The hydraulic control system of claim 3, wherein the damper clutch control valve comprises a valve body and a valve spool installed therein, the valve body of the damper clutch control valve including:

a first port that selectively receives the forward range pressure from the switching valve or the output pressure of the first solenoid valve, a second port that always receives the line pressure, a third port that bypasses the hydraulic pressure supplied through the second port, a fourth port that receives the hydraulic pressure from the torque converter control valve, a fifth port that selectively supplies the hydraulic pressure received through the fourth port to the torque converter, a sixth port that supplies the damper clutch operating pressure to the torque converter or receives the hydraulic pressure exhausted from the torque converter, a seventh port that selectively fluid-communicates with the sixth port so as to exhaust the hydraulic pressure received through the sixth port, an eighth port that selectively fluid-communicates with the sixth port so as to supply the damper clutch operating pressure that is received from the third port, and a ninth port that selectively receives a control pressure; and the valve spool operates by hydraulic pressures supplied through the first and ninth ports.

10. The hydraulic control system of claim 8 or 9, wherein the valve spool of the damper clutch control valve comprises:

a first land that is applied with the control pressure received through the first port;

a second land that selectively enables fluid communication between the second and third ports, cooperatively with the first land;

a third land that selectively enables fluid communication between the fourth and fifth ports, cooperatively with the second land;

a fourth land that selectively enables fluid communication between the sixth and seventh ports, cooperatively with the third land; and a fifth land that is applied with the control pressure of the ninth port and selectively enables fluid communication between the sixth and eighth ports, cooperatively with the fourth land.

* * * * *